Nov. 14, 1939.  L. F. CARTER  2,180,221
RESETTING DEVICE FOR DIRECTIONAL GYROSCOPES
Filed Nov. 6, 1936
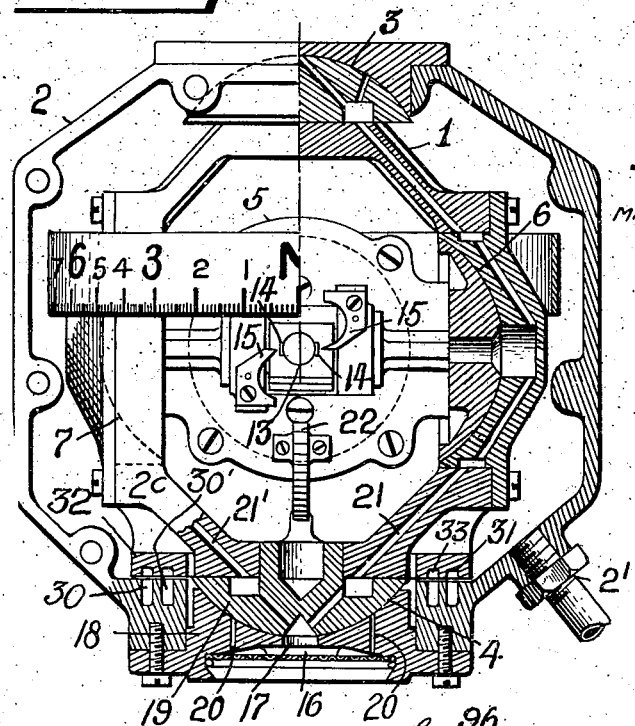
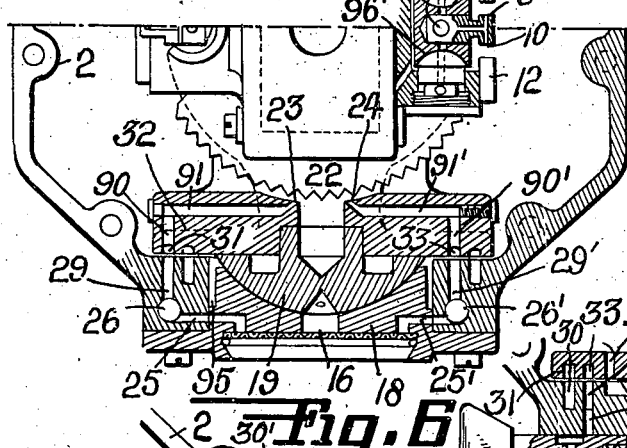
INVENTOR
LESLIE F. CARTER
BY
Herbert H. Thompson
HIS ATTORNEY Patented Nov. 14, 1939

2,180,221

UNITED STATES PATENT OFFICE 2,180,221

RESETTING DEVICE FOR DIRECTIONAL GYROSCOPES

Leslie F. Carter, Leonia, N. J., assignor to Sperry Gyroscope Company, Inc., Brooklyn, N. Y., a corporation of New York Application November 6, 1936, Serial No. 109,474

7 Claims. (Cl. 33—204)

This invention relates to gyro-magnetic compasses wherein the magnetic compass is mounted on and serves to control an otherwise free or directional gyroscope. My invention constitutes an improvement in the type of gyro-magnetic compass shown in my prior application, now Patent No. 2,091,964, dated September 7, 1937, in which air bearings are employed to provide freedom for the gyroscope about its principal axes and, preferably also, to provide freedom for the magnetic compass about its vertical axis. My application also has application to any type of air borne directional gyroscope or other free gyroscope.

Although the gyro-magnetic compass has directive power, that is, it will turn into the north if displaced therefrom, such movement is relatively slow, so that it is desirable to set the compass, before the airplane takes off, in approximately its proper position. The ordinary methods of resetting directional gyroscopes, such as shown in the prior patent to Elmer A. Sperry, Jr., #1,974,220, dated September 18, 1934, are not well suited to a gyro-magnetic compass since the airplane on the ground is usually rearwardly inclined to the horizontal approximately 15°, so that if the gyroscope is caged in that position the axis of the magnetic needle will not be truly vertical and deviation will result. In another case it has been proposed to cage the gyroscope by cutting off the air supply to the air bearings.

According to my invention, I provide a means for resetting the gyroscope by an auxiliary servomotor system which leaves the gyroscope horizontal and does not interfere with the air supply for the air bearings or the pendulous and magnetic compass controls.

Referring to the drawing showing two forms my invention may assume;

Fig. 1 is an end elevation, partly in section, of a gyro-magnetic compass with my invention applied thereto.

Fig. 2 is a side elevation, partly in section, of the lower part of the same.

Fig. 3 is a side elevation, partly in section, showing one form of setting handle or knob.

Fig. 4 is a vertical section taken on broken line 4—4 of Fig. 3.

Fig. 5 is a detail showing the front elevation of the setting handle of Fig. 3.

Fig. 6 is a detail of one of the setting handles used in the form of the invention shown in Fig. 2.

Fig. 7 is a similar view of the companion handle or knob.

The gyro-magnetic compass to which my invention is shown in the drawing as applied is substantially the same as that shown in my aforesaid prior Patent No. 2,091,964. It comprises essentially a vertical ring 1 mounted for rotation about a vertical axis within a sealed casing 2 on upper and lower air flow bearings 3 and 4. Air is normally continuously exhausted from said casing through coupling 2'. Ring 1, in turn, supports a rotor bearing casing 5 for oscillation about a horizontal axis in air flow bearings 6 and 7. On said rotor bearing casing is pivoted on a vertical axis the magnetic element 8, preferably by means of air flow bearings 96 and 96', said element coercing the gyroscope by means of air jets 9 and 10 engaging baffles 11 and 12 to exert a torque about the horizontal axis thereof in case of relative displacement in azimuth of the magnetic needle and the gyroscope. This torque is purposely made weak, so that the gyroscope follows the needle very slowly so as to assume the average position of the same. Similarly, the gyroscope casing is maintained with the rotor spin axis horizontal by a pendulous element 13, from which oppositely directed jets 14 emerge against baffles 15 to exert a torque about the vertical axis in case of relative tilt of the gyro casing and pendulum.

Air is supplied to the air flotation bearings of the several elements through an opening 16 at the bottom of the casing connecting through various passages to the several bearing surfaces, as more particularly described in my aforesaid application. Thus, the air for the lower bearing 4 enters partly through the central opening 17 in the lower cup 18, and a portion of the same passes laterally between said cup and the cooperating button 19, which together form the lower air flow bearing. Some of the air also passes through the passages 20 into said bearing, and additional air passes upwardly through the channels 21, 21' in the vertical ring to the horizontal bearings 6 and 7 to the spin jet for the rotor, to the air bearings and jets for the magnetic and pendulous elements, and the upper vertical bearing 3.

For resetting the gyroscope, I provide on the gyro casing a serrated sector 22 with which cooperate oppositely directed air nozzles 23 and 24, both of which are normally inoperative or closed, but either of which, when operative, exerts a much greater torque on the gyroscope than the torque from nozzles 9 or 10. Air is admitted to said nozzles from the atmosphere through one or more channels 25, 25' leading, in the form shown in Figs. 2, 6 and 7, to a pair of cylinder bores 26, 26', in which are slidably seated cylindrical stems 27 and 27' of a pair of spring pressed push buttons 28, 28'. The cylindrical bores connect with the outside atmosphere through one or more passages 93 and 94. One of said buttons 28, when pushed in, connects the interior of its cylinder with a port 29 connecting with an annular channel 30 registering with an annular channel 31 in the bottom of circular block 32 secured to the vertical ring to rotate with the gyroscope and which supports both nozzle members 23 and 24. Said annular channel 31 is shown as connected to nozzle 23 through bores 90 and 91. Said block 32 is also provided with a plurality of vertical holes 95 to permit the ready escape of air from the lower air bearing 4. Similarly, the other knob 28' connects the channel 29' to the atmosphere and leads air into annular channel 33 in said block, said channel connecting with the other nozzle 24 through bores 90' and 91'. It will readily be apparent, therefore, that by pushing in one or the other of the knobs 28, 28', the gyroscope may be caused to precess in either direction in azimuth as desired to quickly bring the same to the magnetic meridian, or to otherwise reset the same.

In the form of the invention shown in Figs. 3 and 4, a single knob 35 is employed in place of the two knobs 28 and 28', said knob being rotated either to the right or left in accordance with the direction it is desired the gyroscope turn. Said knob is shown as having a hollow cylindrical shank 36 rotatably mounted in a cylindrical bore 37 connected to the atmosphere, said shank having a pair of diametrically opposite but axially spaced lateral holes 38 and 38' adapted to register respectively with small bores 40 and 41 in casing 1'. When said knob is turned so that the arrow 39 thereon (Fig. 5) is vertical, the air is shut off from both nozzles 23 and 24. If, however, the knob be turned 90° to the left in Fig. 5, the opening 38 (Fig. 4) is brought into line with an L-shaped channel or bore 40 leading upwardly to connect with the annular channel 33 in block or ring 32. In case, however, the handle 35 is rotated in the opposite direction, air will be admitted to the opposite bore or channel 41 and the outer annular channel 31, as will be readily apparent, and the gyroscope precessed in the opposite direction.

With my improved setting device, the gyroscope may be quickly brought to the magnetic meridian without disturbing the horizontal balance of the gyroscope or the vertical position of the pivotal axis of the needle.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In an air borne directional gyroscope, an outer casing, a rotatable vertical ring, air bearings for mounting the same for rotation about a vertical axis in said casing, a rotor casing, air bearings for mounting the same in said ring for oscillation about a horizontal axis, a pair of normally inoperative air nozzles mounted in said ring for exerting torques on said casing about its horizontal axis, and knob controlled valve means for rendering either nozzle effective to reset the gyroscope, passages being provided to lead air from the exterior of said casing to said nozzles distinct from the air passages to said air bearings.

2. In a directional gyroscope, the combination with the oscillatable rotor bearing casing, rotatable vertical ring and outer casing, air jet means mounted on said ring for exerting torques about the horizontal axis of said bearing casing in either direction, channel means for leading air to said jet means, knob means fixed in said outer casing for turning either of said jet means on at will, and separate channels and ports for leading an air supply from said outer casing into said vertical ring and to each jet.

3. In an air borne directional gyroscope, the combination with the oscillatable rotor bearing casing, rotatable vertical ring and outer casing and air flow bearings between both said casings and said ring, air jet means mounted on said ring for exerting torques about the horizontal axis of said bearing casing in either direction, manually operated valve means fixed in said outer casing for turning on either of said jet means at will, and a member on said ring having channels adjacent the lower air flow bearing between said outer casing and ring for leading air from said valve means to said jet means, said member having additional apertures permitting the air from said bearing to escape.

4. In an azimuth indicating free or directional gyroscope having an outer casing and means for continuously withdrawing air therefrom, a vertical ring rotatably mounted therein, a compass card fixed to said ring and a rotor bearing frame pivoted in said ring on a horizontal axis, means for resetting said card and ring at will comprising a pair of oppositely directed air jets turnable with said ring, intercepting means on said frame against one or the other of which said jets strike to exert a torque about the horizontal axis of said frame to cause precession in azimuth, air passages leading from without to within said casing, connecting air passages leading within said ring to said jets, and valve means within said casing for opening and shutting off communication of either or both of said passages to the atmosphere to control set jets to correct the position of the gyroscope in azimuth.

5. In a gyro-magnetic compass, the combination with a directional gyroscope, a magnetic element pivotally mounted thereon for rotation about a vertical axis only and air jet means of limited power controlled thereby for slowly orienting said gyroscope, of means for quickly setting said gyroscope upon relative azimuthal rotation of said gyroscope and element from a predetermined N-S position into said position, comprising normally inoperative air jet means for exerting a much greater torque about the horizontal axis only of said gyroscope than is exerted by said first named means, and means for rendering said second air jet means temporarily operative to initially set the gyroscope near the N-S position.

6. A gyro-magnetic compass comprising a directional gyroscope of the vacuum driven type, a magnetic element pivotally mounted thereon for rotation about a vertical axis, air jets adapted to be differentially controlled by relative displacement of said gyroscope and element and so constructed and arranged as to slowly precess the gyroscope in azimuth in either direction to maintain it synchronized with said magnetic element, air jets of greater capacity mounted so as to impinge upon and cause more rapid precession of said gyroscope in azimuth during the initial setting of the gyroscope near the meridian, and a resetting valve controlling the admission of atmospheric air to said last named jets for resetting the gyroscope.

7. In a gyro-magnetic compass, the combination with a directional gyroscope and a magnetic element, air jet means of limited power controlled by departure of said gyroscope and element from a predetermined azimuthal position for applying a torque about the horizontal axis of said gyro to slowly orient said gyroscope, of means for quickly setting said gyroscope into the said approximate position, comprising normally inoperative air jet means for exerting a much greater torque about the horizontal axis of said gyroscope than is exerted by said first named means, and means for rendering said second air jet means temporarily operative to initially set the gyroscope near the said position.

LESLIE F. CARTER.